US012589599B2

(12) United States Patent
Sambhy et al.

(10) Patent No.: US 12,589,599 B2
(45) Date of Patent: Mar. 31, 2026

(54) DIAGNOSTIC SHEET AND DETECTION METHOD FOR INKJET PRINTS USING PAPER PRECOAT SOLUTIONS

(71) Applicant: XEROX CORPORATION, Norwalk, CT (US)

(72) Inventors: Varun Sambhy, Pittsford, NY (US); Mark C. Petropoulos, Jr., Webster, NY (US); Peter M. Gulvin, Webster, NY (US); Anthony S. Condello, Webster, NY (US); Seemit Praharaj, Webster, NY (US); Douglas K. Herrmann, Webster, NY (US); Christine A. Steurrys, Williamson, NY (US); Jason M. LeFevre, Penfield, NY (US); Palghat S. Ramesh, Pittsford, NY (US); Jorge A. Alvarez, Webster, NY (US); Brian Lindstrom, Victor, NY (US)

(73) Assignee: XEROX CORPORATION, Norwalk, CT (US)

(*) Notice: Subject to any disclaimer, the term of this patent is extended or adjusted under 35 U.S.C. 154(b) by 137 days.

(21) Appl. No.: 18/594,923

(22) Filed: Mar. 4, 2024

(65) Prior Publication Data

US 2025/0276533 A1      Sep. 4, 2025

(51) Int. Cl.
*B41J 2/21*          (2006.01)
*C09D 11/54*        (2014.01)
(Continued)

(52) U.S. Cl.
CPC .......... *B41J 2/2139* (2013.01); *B41J 2/2114* (2013.01); *B41J 2/2135* (2013.01); *B41J 2/2142* (2013.01);
(Continued)

(58) Field of Classification Search
None
See application file for complete search history.

(56) References Cited

U.S. PATENT DOCUMENTS

| | | | |
|---|---|---|---|
| 8,721,033 B2 | 5/2014 | Mongeon et al. | |
| 2004/0017449 A1* | 1/2004 | Stovold | B41M 3/142 347/100 |
| 2015/0240098 A1* | 8/2015 | DeMille | C09D 11/50 428/201 |

FOREIGN PATENT DOCUMENTS

| | | | | |
|---|---|---|---|---|
| JP | 3136988 U | * | 11/2007 | |
| WO | WO-2017223198 A1 | * | 12/2017 | B41M 5/34 |

OTHER PUBLICATIONS

Guzzo, Machine TranslationofWO-2017223198-A1, 2017 (Year: 2017).*

片口 真, MachineTranslationofJP-3136988-U, 2007 (Year: 2007).*

* cited by examiner

*Primary Examiner* — Scott A Richmond
(74) *Attorney, Agent, or Firm* — MH2 Technology Law Group LLP

(57)          ABSTRACT

A diagnostic system for measuring inkjet printing system performance includes a printhead that deposits a colorless precoat solution from one or more of a plurality of ejector jets. The diagnostic system includes a diagnostic sheet, having a substrate, and a layer of material disposed on a first surface of the substrate, where the layer of material changes color after contacting the precoat solution, and an image scanner configured to capture a pattern on a surface of the diagnostic sheet after the precoat solution is deposited. The layer of material of the diagnostic sheet may include a moisture sensitive composition or a pH indicator. A method includes providing a diagnostic sheet to an inkjet printing system, where the diagnostic sheet may include a layer of (Continued)

material that changes color after contacting a precoat solution, and when needed, correcting one or more jetting operations.

17 Claims, 3 Drawing Sheets

(51) Int. Cl.
  *G01N 31/22*        (2006.01)
  *G06T 7/00*         (2017.01)
  *G06T 7/90*         (2017.01)
(52) U.S. Cl.
  CPC ........... *C09D 11/54* (2013.01); *G01N 31/221*
      (2013.01); *G06T 7/001* (2013.01); *G06T 7/90*
      (2017.01); *G06T 2207/10024* (2013.01); *G06T*
                          *2207/30144* (2013.01)

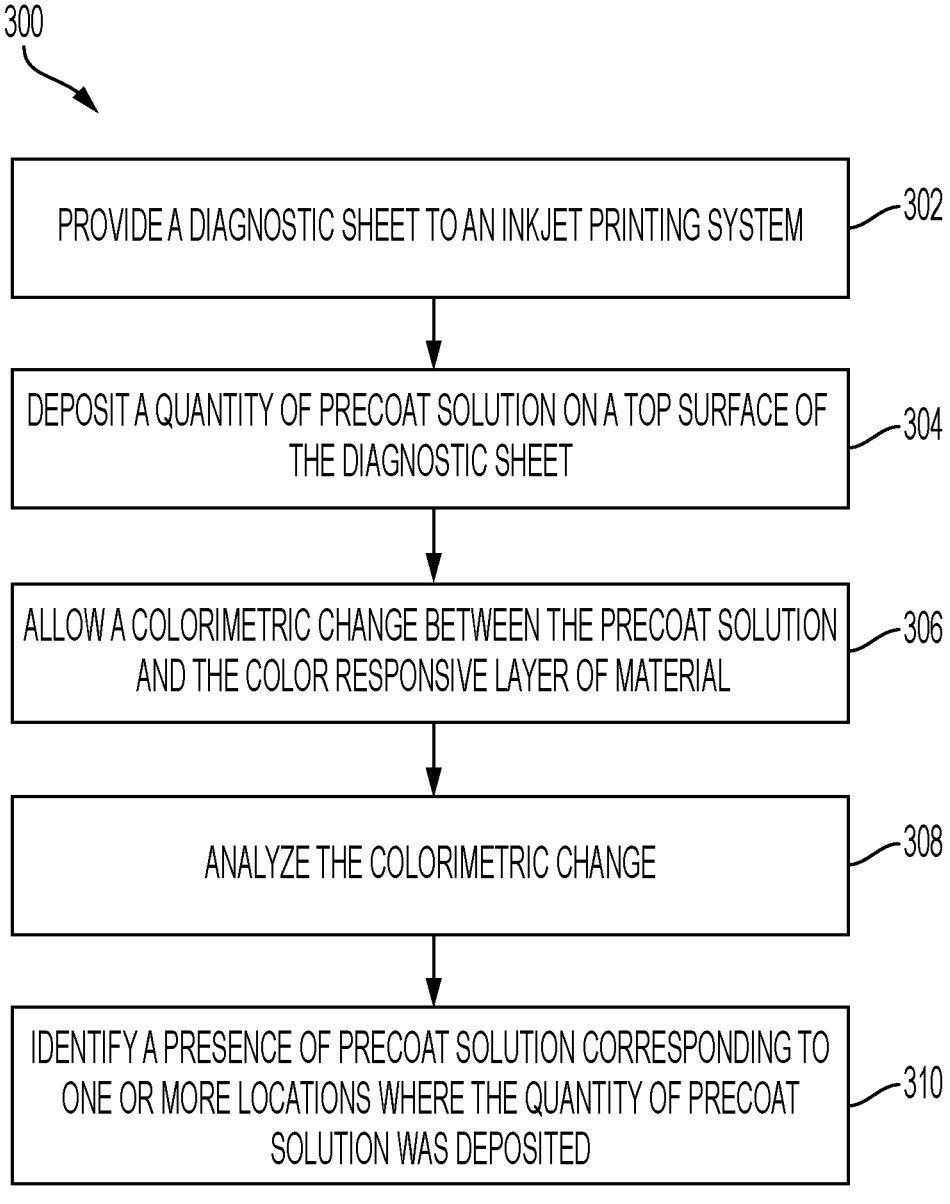

*300*

PROVIDE A DIAGNOSTIC SHEET TO AN INKJET PRINTING SYSTEM —302

DEPOSIT A QUANTITY OF PRECOAT SOLUTION ON A TOP SURFACE OF THE DIAGNOSTIC SHEET —304

ALLOW A COLORIMETRIC CHANGE BETWEEN THE PRECOAT SOLUTION AND THE COLOR RESPONSIVE LAYER OF MATERIAL —306

ANALYZE THE COLORIMETRIC CHANGE —308

IDENTIFY A PRESENCE OF PRECOAT SOLUTION CORRESPONDING TO ONE OR MORE LOCATIONS WHERE THE QUANTITY OF PRECOAT SOLUTION WAS DEPOSITED —310

FIG. 3

DIAGNOSTIC SHEET AND DETECTION METHOD FOR INKJET PRINTS USING PAPER PRECOAT SOLUTIONS

TECHNICAL FIELD

The present teachings relate generally to a system and method for precoating paper and, more particularly, to detection of precoat system functionality using diagnostic sheets.

BACKGROUND

Digital aqueous ink jet (AIJ) printing is an area of growth for several production class printing systems. Printers or consumers of printed materials making or considering a transition from a dry powder (electrophotographic) printing system to an acoustic ink jet printing system or printing press require the maintenance of existing image quality (IQ) and print permanence and durability characteristics while reducing run cost per kiloprint (kp). Exemplary printing systems using the aqueous ink jet printing methods have significantly improved print image quality matching or exceeding current electrophotographic printing methods.

The image quality of aqueous ink images printed onto various types of media varies according to the type of media being printed. Image quality is typically exemplary when the aqueous ink is printed onto offset coated, non-glossy media because the ink remains on top of the coating. Aqueous ink printing onto uncoated, porous media, however, produces washed out, poorer quality images because the inks are absorbed into the fibers of the paper. To avoid this consequence, coatings can be applied to porous media to reduce the absorption of the inks into the media. Primers, also known as precoat solutions, reduce the interaction of the inks with the media since the primer is interposed between the media and the inks. Because the ink image is fixed to the primer layer rather than the media, the ink image can be more easily removed. The ease of ink image removal from media is a significant factor in recycling printed media. In systems using inkjet printheads to apply primer, or precoat solutions, to print media, it is important to understand and provide mitigation interventions for missing or misdirected jets in a precoat application system.

Therefore, it is desirable to develop or design methods or systems to detect uniformity and placement of precoat solution on print media in aqueous based ink jet printing systems.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A diagnostic system for measuring inkjet printing system performance includes a printhead that deposits a colorless precoat solution from one or more of a plurality of ejector jets. The diagnostic system includes a diagnostic sheet, having a substrate having a first surface and a second surface, and a layer of material disposed on the first surface of the substrate, where the layer of material changes color after contacting the precoat solution, and an image scanner configured to capture a color pattern on a surface of the diagnostic sheet after the precoat solution is deposited on the layer of material disposed on the first surface of the substrate. Implementations of the diagnostic system include where the precoat solution may include 5% wt to 40% wt of a salt in an aqueous solution. The image scanner can be inline with respect to the inkjet printing system. The layer of material of the diagnostic sheet may include a moisture sensitive composition. The moisture sensitive composition may include cobalt chloride. The layer of material of the diagnostic sheet may include 1-(1-hydroxy-2-naphthylazo)-6-nitro-2-naphthol-4-sulfonicacidsodium salt, 3-hydroxy-4-[(2-hydroxy-4-sulfonaphthalen-1-yl)diazenyl]naphthalene-2-carboxylic acid, 1-(1-hydroxy-4-methyl-2-phenylazo)-2-naphthol-4-sulfonic acid, or a combination thereof. The layer of material of the diagnostic sheet may include a pH indicator. The substrate may include paper. The precoat solution may include magnesium chloride, calcium nitrate, barium, or a combination thereof.

A method for diagnosing inkjet printing system performance includes providing a diagnostic sheet to an inkjet printing system, where the diagnostic sheet may include a top surface may include a layer of material that changes color after contacting a precoat solution, depositing a quantity of a colorless precoat solution on a top surface of the diagnostic sheet, resulting in a colorimetric change of the layer of material. The method also includes analyzing the colorimetric change to identify a presence or location of precoat solution corresponding to one or more locations where the quantity of colorless precoat solution was deposited. Implementations of the method for diagnosing inkjet printing system performance may include where the layer of material of the diagnostic sheet may include a moisture sensitive composition. The moisture sensitive composition may include cobalt chloride. The layer of material of the diagnostic sheet may include 1-(1-hydroxy-2-naphthylazo)-6-nitro-2-naphthol-4-sulfonicacidsodium salt. Layer of material of the diagnostic sheet may include a pH indicator. Analyzing the colorimetric change may include scanning the diagnostic sheet with an image scanner, and analyzing the colorimetric change may include comparing a pattern of deposited precoat solution with a colorimetric change in one or more locations of the pattern of deposited precoat solution. Depositing a quantity of a colorless precoat solution on a top surface of the diagnostic sheet may include jetting a plurality of drops of precoat solution using a printhead may include a plurality of individual jets. The method for diagnosing inkjet printing system performance may include disabling one or more jets if the presence or location of precoat solution identified on the diagnostic sheet is different than an expected presence or location. Correcting a jetting operation may include supplementing jetting using one or more additional jets, adjusting a timing of one or more individual jets, or a combination thereof. Implementations of the described techniques may include hardware, a method or process, or computer software on a computer-accessible medium.

A diagnostic sheet is described, including a substrate having a first surface and a second surface. The sheet also includes a layer of material disposed on the first surface of the substrate. The sheet also includes where the layer of material changes color when in contact with a precoat solution.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIG. 3 is a flowchart illustrating a method of diagnosing precoat jetting issues in an aqueous ink jet printing system, in accordance with the present disclosure.

Figure 1:
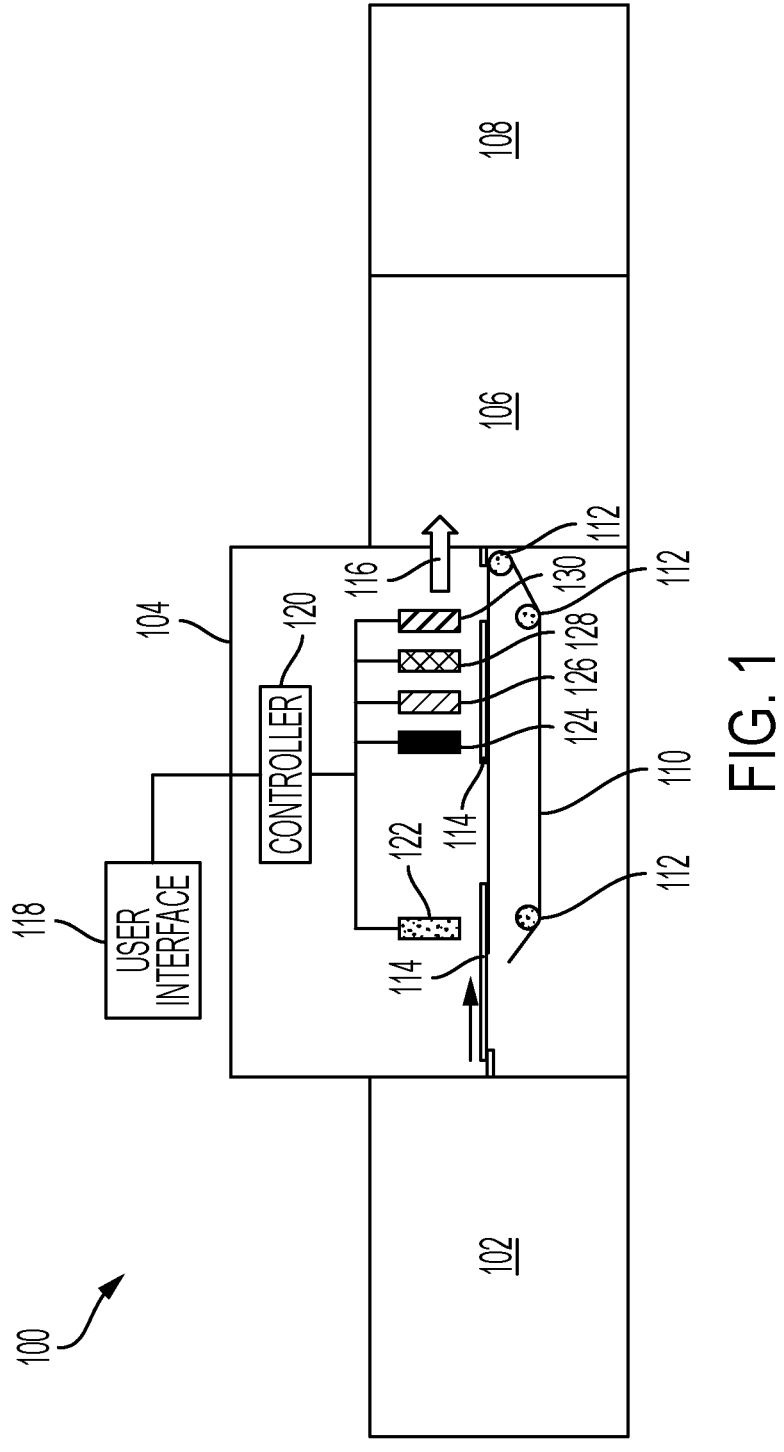
FIG. 1 is a schematic diagram of a system and method for pre-coating paper prior to ink jet printing, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The apparatus and methods of the present disclosure solves the problem of diagnosing and detecting inconsistent deposition of primer or pre-coat solution in an aqueous ink jet printing system, where primer or precoat is used to improve print quality and de-inkability in production ink jet printing presses. To address this issue, a method and system are proposed to run a diagnostic sheet through an ink jet printing system through a system capable of depositing a precoat solution with the use of an inkjet printhead. The precoat solution, also referred to as a precoat composition, precoat, primer, or primer solution, can include an aqueous salt solution that improves ink adhesion and de-inkability by "crashing" or precipitating the ink pigment portion of the ink composition and preventing it from sinking or diffusing into the bulk of the paper. As used herein, the term "primer" or "precoat" can be defined as coatings or solutions that are applied to media to improve the image quality of the ink images over that which is achieved without the coatings. The use of a salt solution as a precoat solution has several advantages, including low material cost and the ability to improve print quality on both coated and uncoated paper. The effect of "crashing," precipitating, or causing the precipitation of a component of an ink can include any single chemical or combination of chemicals in relation to a printed ink or other printing related fluid that can facilitate the desolubilization or precipitation of one or more components in the ink. The desolubilizing can be accomplished by proton transfer from collision or close proximity of a crashing agent with one or more of the ink components. The desolubilizing can be caused by component associations induced by a combination of a precoat solution and/or component associations occurring with the precoat solution. An additional feature of the primer or precoat solution is that it is an inherently colorless precoat solution and thus does not effect colors of any ink droplets or patches upon interaction under normal use. The combination of a diagnostic receiver sheet, in accordance with the present teachings, can, however, provide a detectable, visible effect for diagnosing missing or errant ejector jets in a printhead or array of one or more printheads.

The mechanism by which the precoat solution crashes or causes the precipitation of the ink pigments at the surface is alternatively reasoned to be via the breaking of the surface tension of the ink which causes the pigments, dyes, or other components to precipitate and adhere to the surface of the paper. The use of an inkjet print head to deposit a primer solution provides a uniform and consistent coating of the solution on the paper, thus ensuring that the solution sufficiently covers all areas of the paper.

The present disclosure provides the use of colorimetric indicators incorporated into diagnostic media to detect missing jets and printing performance in a primer application module for identifying areas where the primer or precoat solution has not been deposited correctly, which can affect print quality. A method using indicator sheets or diagnostic sheets differs from other known detection methods as it relies on an appearance change or color change property of the sheet itself, rather than requiring additional hardware or software. In some cases, an image scanner or image sensing module can be used to further automate the method in conjunction with the use of a diagnostic sheet. The diagnostic sheets can be used in conjunction with existing inline scanning and element controls to detect missing jets and printing performance by running them through a printer along with print media. Automated or inline scanning can further help mitigate some of the potential challenges associated with using colorimetric indicators, including the optimization of indicator concentration and coating conditions, as well as interference from other ions or substances present on printing media or within the printing process or ink compositions.

In the present teachings, the terms "xdp" (x-dot position) and "ydp" (y-dot position) refer to a position of a dot, or pixel as jetted by one or more of a plurality of jets in a printhead in the examples of the present disclosure. The manipulation and understanding of these concepts are integral to the detection and correction of dots generated by mis-directed jets during ink jet printing of the primer or precoat solution. An error in x-dot position means jets are printing too close to each other in the cross-process direction, or relative to a width of the media. If the misdirection is greater than a specified threshold, the software can automatically disable the jet and add it to the missing jet list within the system or otherwise record the presence of one or more missing or misdirected jets. An error in xdp can be corrected by using neighboring pixels jetted from neighboring jets to add extra drops from a neighbor to accommodate for the missing or misdirected dot. Y-dot position refers to irregularities relative to an in-process direction and can be adjustable by changing the firing timing of the individual jets in one or more printheads. This does not necessarily require additional jetting from an adjacent or neighboring jet. When the diagnostic sheet of the present disclosure is measured, a jet is missing if the observed or measured drop of the jet is too far away from its centroid, also known to be an intended target location. An additional correction step could include alignment of a printhead relative to one another. An entire printhead can be adjusted in an x-direction (known as stitch), y-direction (device offset adjustment-timing, which moves the entire image for the head), roll (angle of head), or a combination thereof. This is also a procedure that can be conducted when a printhead is replaced. For the purposes of the present disclosure, these adjustments or corrections would be conducted on the primer printhead. They can normally be conducted on the other printheads containing and ejecting ink droplets, but the results of the present diagnostic method and system can be used to perform one or more of these alignment operations on the primer printhead, if necessary, or when changing out to a new printhead for primer deposition. Examples of the present disclosure can further include disabling one or more jets if the presence or location of precoat solution identified on the diagnostic sheet is different than an expected presence or location, or correcting a jetting operation of one or more of the individual jets if the presence or location of precoat solution identified on the diagnostic sheet is different than an expected presence or location. As mentioned previously and further described herein, a correction can include supplementing jetting using one or more additional jets, adjusting a timing of one or more individual jets, or a combination thereof.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto different types of media to form ink images.

FIG. 1 is a schematic diagram of a system and method for pre-coating paper prior to ink jet printing, in accordance with the present disclosure. The system and method for pre-coating paper prior to ink jet printing can be integrated in entirety, or in part, into a high-speed color inkjet printer 100. The system and method of the present disclosure includes a diagnostic sheet and method of detecting missing or misdirected jets. FIG. 1 depicts a high-speed color inkjet printer 100 that uses a primer measuring method in conjunction with a diagnostic sheet to identify accurately the location of precoat solution or primer applied to media in the printer to enable media to be treated with primers effectively and efficiently. More specifically, the primer measuring method and diagnostic sheet can provide an indication of missing locations of application of precoat solution. As illustrated, the printer 100 is a printer that directly forms an ink image on a surface of a media sheet stripped from one of the supplies of media sheets stored within a paper feeder 102 and the sheets are moved through the printer 100 in a process direction 116 by a controller 120 operating one or more of the actuators that are operatively connected to rollers or to at least one driving roller of conveyor that comprise a portion of the media transport 110 that passes through the print engine module 104 of the printer. In one example, each printhead module has only one printhead that has a width that corresponds to a width of the widest media in the cross-process direction that can be printed by the printer. In other examples, the printhead modules have a plurality of printheads with each printhead having a width that is less than a width of the widest media in the cross-process direction that the printer can print. In these modules, the printheads are arranged in an array of staggered printheads or a linear array of printheads that abut one another to enable media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 100 is depicted with only two supplies of media sheets, the printer can be configured with three or more sheet supplies, each containing a different type or size of media.

With further reference to FIG. 1, the printed image exits the print engine module 104 having a print zone of printer 100 and passes under one or more image dryers 106 after the ink image is printed on a sheet, represented herein as a more generic media 114. As used in this document, the term "print zone" means an area of a media transport opposite the printheads of an inkjet printer. The image dryer 106 can include an infrared heater, a heated air blower, air returns, or combinations of these components to heat the ink image and at least partially fix an ink image to the sheet. An infrared heater applies infrared heat to the printed image on the surface of the sheet to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer. In normal printing operations, the media 114 or sheet is jetted upon with ink or primer or precoat solution in an imagewise fashion and transported through the print zone to create a multicolor image. In examples of the present disclosure, the media 114 includes a diagnostic sheet for measuring or detecting missing or mis-directed jets in a printhead configured to dispose or apply precoat solution or primer to the diagnostic sheet.

Prior to reaching the print zone, the media 114 passes beneath a primer application module 122. The primer application module 122 includes one or more printheads configured as described previously. These printheads ejected drops of primer onto the media prior to the media being printed by the printhead modules 124, 126, 128, and 130. The location and presence of primer applied to the media 114 is measured by a detector. In examples, the detector can be inline and positioned within the printing system 100 or can be external to the printer 100, such that a diagnostic sheet can be evaluated offline. The signal generated by the detector can be a visual signal, perceptible by an operator, or provided to the controller 120 via an inline scanner, image analysis or detector. An inline scanner is considered to be inline with respect to the process such that scanning can occur within a printing machine during normal operation and without undue interruption. Alternate examples can have the diagnostic sheet being taken offline to an external scanner or other image capture or analysis station known to those skilled in the art for further detection or analysis. The controller 120 is configured with programmed instructions stored in non-transitory, computer readable media that when executed cause the controller to identify the amount and thickness of primer on the media and adjust the operation of the primer application module 122 to correct the application of the primer for the type of media being printed in normal operation, or indicate a need for a manual operation or intervention by a machine operator. The mechanism of the diagnostic sheet is described in further detail herein.

In examples of a printer 100 as shown and described herein, a return path for printing duplex, or two-sided images can be employed, as well as an accompanying duplex path and controller instructions as needed. FIG. 1 also shows the printed sheets or diagnostic media as being collected in the output module 108, but in examples, they can be directed to other processing stations (not shown) that perform tasks such as folding, collating, binding, and stapling of the media sheets.

Operation and control of the various subsystems, components and functions of the machine or printer 100 are performed with the aid of a controller or electronic subsystem (ESS) 120. The ESS or controller 120 is operatively connected to the components of the printhead modules 122, 124, 126, 128, and 130 (and thus the printheads), the detector, the image dryer 106, output module 108 and other system components not necessarily shown herein for purposes of clarity. The ESS or controller 120, for example, is a self-contained computer having a central processor unit (CPU) with electronic data storage, and a display or user interface (UI) 118. The ESS or controller 120, for example, includes a sensor input and control circuit as well as a pixel placement and control circuit. In addition, the controller 120 reads, captures, prepares, and manages the image data flow between image input sources, such as a scanning system or an online or a work station connection (not shown), and the printhead modules 122, 124, 126, 128, and 130. As such, the ESS or controller 120 is the main multi-tasking processor for operating and controlling all of the other machine subsystems and functions, including the printing process.

The controller 120 can be implemented with general or specialized programmable processors that execute programmed instructions. The instructions and data required to perform the programmed functions can be stored in non-transitory, computer readable medium associated with the processors or controllers. The processors, their memories, and interface circuitry configure the controllers to perform the operations described below when the programmed instructions are executed. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 120 from either a scanning system or an online or work station connection for processing and generation of the printhead control signals output to the printhead modules 122, 124, 126, 128, and 130. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image to be printed on a media sheet.

In examples of the present disclosure, the diagnostic system for measuring inkjet printing system performance can include at least one printhead, configured to deposit a precoat solution or primer, a diagnostic sheet, comprising a substrate having a first surface and a second surface, and a layer of material disposed on the first surface of the substrate, wherein the layer of material is color responsive to the precoat solution for example changes color when in contact with a precoat solution, and an image scanner configured to capture a color pattern on a surface of the diagnostic sheet after the precoat solution is deposited on the layer of material disposed on the first surface of the substrate. In examples, the precoat solution can include from about 5% wt to about 40% wt of a salt in an aqueous solution, as well as other compositional parameters or ingredients as described herein.

Figure 2:
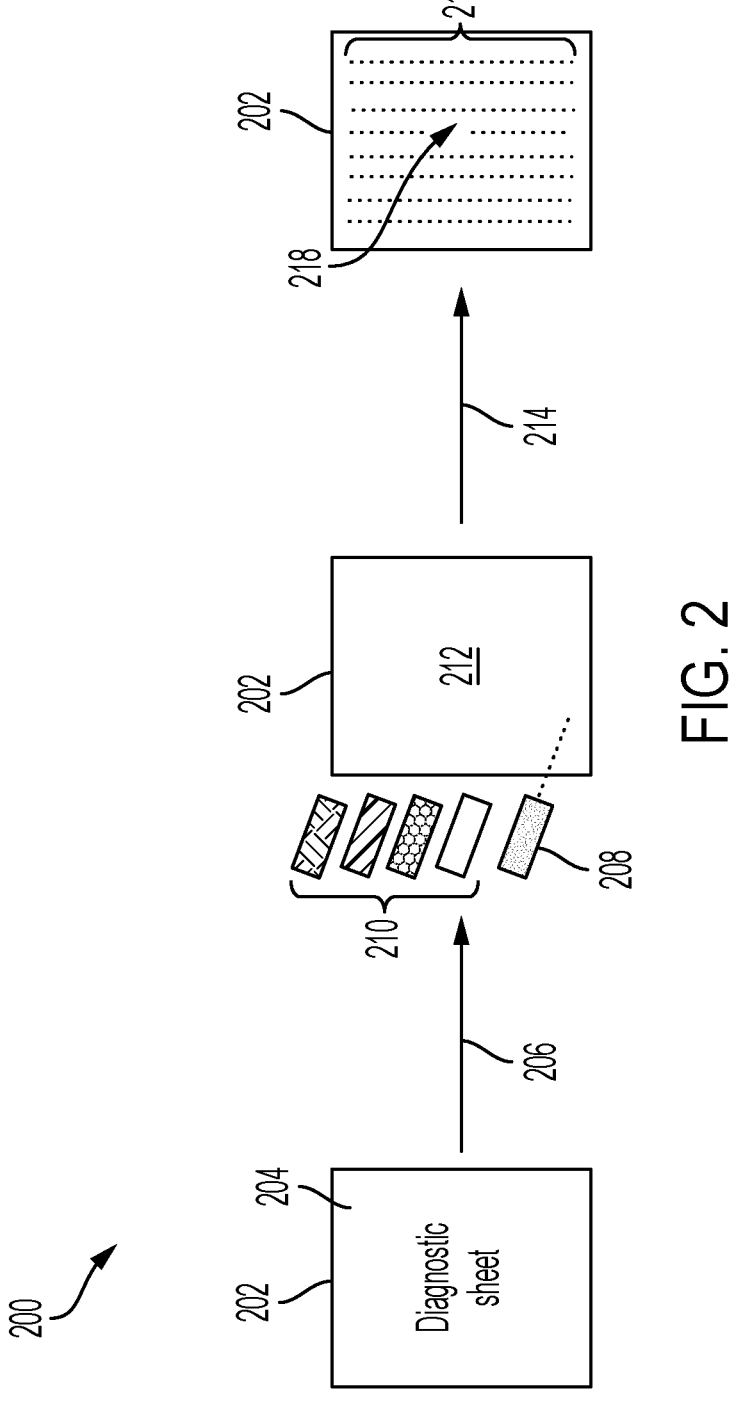
FIG. 2 is a schematic for a method of diagnosing precoat jetting issues in an aqueous ink jet printing system, in accordance with the present disclosure.

FIG. 2 is a schematic for a method of diagnosing precoat jetting issues in an aqueous ink jet printing system, in accordance with the present disclosure. A schematic for a method 200 of diagnosing precoat jetting issues in an aqueous ink jet printing system is shown, with a diagnostic sheet 202 which is a base substrate. The diagnostic sheet 202, in examples can be or include a paper substrate, plastic substrate, other suitable material as known by one skilled in the art. Plastic sheets can include vinyl, polypropylene (PP), high-density polyethylene (HDPE), polyethylene terephthalate (PET), biaxially oriented polypropylene (BOPP), and the like. In examples, the diagnostic sheet 202 can be in a form of a sheet, or in some cases, on a roll or continuous web to be fed through a printing zone of an ink jet printing system as described herein. The diagnostic sheet 202 includes a top surface having a layer of material 204 disposed on the top surface of the diagnostic sheet 202. A step 206 includes running an image quality pattern using only a primer or precoat print head to deposit a pattern of primer onto the layer of material disposed on the first surface, or top surface of the diagnostic sheet 202, using a primer printhead 208 or a precoat application module. There are also ink printheads 210 shown as an example of the presently disclosed method using a four-color system, although alternate examples can include more than four colors of printheads can be utilized. The primer or precoat 212 is printed or jetted in a pattern on a layer of material 204 disposed on the first surface of the substrate of the substrate sheet 202. A step 214 includes where a scanner, inline or external to the system, captures a color change and exposes a visual representation of missing jets on the surface of the substrate sheet 202. The color change 216 on the surface of the diagnostic sheet 202 is the result of a color change or visible reaction product between the precoat 212 and the layer of material 204 on the diagnostic sheet 202. At this stage, a gap or absence of color change 216 can be indicative of missing jets 218 in the primer printhead or application printhead. In other examples, the positioning of the color change can be different than expected when scanned or analyzed, which can be indicative of a mis-directed or plugged jet, as well as a missing jet.

The diagnostic sheet 202 composition and structure can include a substrate having a first surface and a second surface, and a layer of material disposed on the first surface of the substrate, and wherein the layer of material is color responsive to a precoat solution. Several categories of color responsive materials can be incorporated onto or into the layer of material on a surface of the substrate sheet 202. In examples, the layer of material of the diagnostic sheet comprises a moisture sensitive composition. For example, the moisture sensitive composition comprises cobalt chloride, which is a blue indicator that changes to red and also to white upon exposure to water. Several indicators that change color when exposed to liquid water can be utilized in this diagnostic sheet layer material. Examples, in addition to cobalt chloride, can include various water sensing tapes, which change color from white to red when exposed to water. Such water sensing tapes can include those such as 3M™ Water Contact Indicator Tapes, available from 3M. Diagnostic sheets of similar materials can be made by coating media with solutions or dispersions of indicator materials as described herein. Coatings can be easily done beforehand and offline using a rod coater, draw bar coater, spray coater, handheld anilox roll or just a simply using a handheld foam pad. Concentration and amounts of indicators to be coated can be optimized towards obtaining detectable color change. Such diagnostic sheets would be isolated from atmospheric humidity until just prior to printing or use. This can be done easily by sealing in plastic bag, for example. In examples, the diagnostic sheet could be reused, as color change is reversible and as primer dries the color change can revert to an original appearance. In other examples, the primer or precoat solution can contain humectants such as glycerol that can absorb water and inhibit or slow down ambient drying. Other materials useful as colorimetric indicators can change color when exposed to metal ions, such as calcium or magnesium, or other metals included in primer or precoat solutions. These materials can be used to quantify such metal ions. Examples include materials such as Eriochrome® black T, which is a blue-appearing indicator changes color to pink when exposed to $Ca^{2+}$ or $Mg^{2+}$ ions, Patton and Reeder's indicator (PR), which is a blue appearing indicator that changes to red when exposed to $Ca^{2+}$ or $Mg^{2+}$ ions, or calmagite, or 1-(1-hydroxy-4-methyl-2-phenylazo)-2-naphthol-4-sulfonic acid.

Diagnostic sheets can be made by coating media with solution of indicator. Coatings can be easily done beforehand offline using rod coater, draw bar coater, spray coater, handheld anilox roll or just a simply using handheld foam pad. The specific concentration and amount of indicator to be coated can be optimized towards obtaining detectable color change in systems and methods of the present disclosure. An additional category of materials for use on a surface of a diagnostic sheet can include materials used for measuring a change in pH. Known pH indicator strips are known and can be fabricated in different sizes or as sheets for feeding through a printing system as described herein. In examples, a drop of precoat solution or primer having a pH of approximately 8 was placed on a commercial pH paper strip, and a color change was easily visually observable, which could be easily detectable by an inline or external scanner or detector. In examples, the layer of material of the diagnostic sheet comprises 1-(1-Hydroxy-2-naphthylazo)-6-nitro-2-naphthol-4-sulfonicacidsodium salt, 3-hydroxy-4-[(2-hydroxy-4-sulfonaphthalen-1-yl)diazenyl]naphthalene-2-carboxylic acid, 1-(1-hydroxy-4-methyl-2-phenylazo)-2-naphthol-4-sulfonic acid, pH indicators, or combinations thereof.

In examples, the application of a precoat composition can be accomplished in an imagewise fashion, such as by selective ejection or spray application, or by a drop-on-demand type printhead. In an example, a print head assembly or array, or a liquid ejector can be positionable, i.e. translate across a lateral dimension (from side to side) of a paper, or movable to be further away from or closer to a surface of a paper, or addressable to actuate only specific jets to eject small drops or droplets of precoat composition a onto a surface of the paper, or be arranged in an array, in an imagewise fashion. In this context, imagewise fashion can be defined as applying a precoat formulation to approximate locations on a surface of the paper that correspond to locations on the paper where an ink ejector printhead will subsequently print an image on the same surface of the paper in a same approximate location. Each subsequent page, sheet, or section of a continuous paper web can have the same image printed upon a surface of the paper, and thus will have a precoat composition applied in the same or similar locations on a surface of the paper as the image or ink that is applied to the surface of the paper. In other examples, each subsequent page, sheet, or section of a continuous paper web can have a different or variable image printed upon a surface of the paper, and thus will have a precoat composition applied in the same or similar variable locations on a surface of the paper as the variable image or ink that is applied to the surface of the paper.

In examples, the precoat solution can include an aqueous salt solution. For example, the precoat solution can include magnesium chloride, calcium nitrate, barium, any water soluble salt of $Ca^{2+}$, $Mg^{2+}$, $Ba^{2+}$, $B^{3+}$, $Al^{3+}$, or combinations thereof. In essence, divalent or trivalent cations are the active species included in a precoat solution. They destabilize one or more of the ink components, colloids, latex, pigments, and the like, and cause them to precipitate out of suspension or dispersion within the ink composition. A representative primer, primer solution, or precoat solution composition can be found in Table 1. All values are represented in % by weight of a total precoat solution or primer composition.

TABLE 1

| Representative Precoat (Primer) Solution Composition | | | |
|---|---|---|---|
| Chemical | Amt in 1 kg | % by wt | Suitable Range (% by wt) |
| Glycerol | 21.8 | 2.2 | 0-5 |
| Propylene Glycol, (can also include other cosolvents like butanediol, pentanediol, hexanediol, glycol ethers like diethylene glycol monoethyl ether, dipropylene glycol methyl ether, similar to cosolvents that may be present in ink formulations) | 197.7 | 19.8 | 10-40 |
| Water | 509 | 50.9 | 30-70 |
| Magnesium Nitrate Hexahydrate (can also include other metal salts as described herein) | 270 | 27.0 | 10-50 |
| Surfactant TT4000 | 7 | 0.7 | 0.1-3 |
| Biocide Proxel | 1.45 | 0.1 | 0.1-1 |

In an example, the precoat solution comprises a magnesium chloride solution in water, where in any case, the precoat solution can include 5% wt to 40% wt of a salt in an aqueous solution based on a total weight of the aqueous solution. Other examples include from about 1% wt to about 50% wt, or from about 10% wt to about 50% wt, or from about 10% wt to about 20% wt of a salt in an aqueous solution based on a total weight of the aqueous solution.

In examples, the precoat application system can be combined for use with a digital printer, an offset press, or a combination thereof. For example, the precoat application system can be paired in a separate module with any type of printing system. Furthermore, the precoat application system can be used to precoat paper, and then printed at a later time, which need not be immediately after precoating. The paper can include uncoated paper or coated paper, or paper in the form of one or more discrete sheets, or alternatively in a continuous web format.

FIG. 3 is a flowchart illustrating a method of diagnosing precoat jetting issues in an aqueous ink jet printing system, in accordance with the present disclosure. A method for diagnosing inkjet printing system performance 300 includes providing a diagnostic sheet to an inkjet printing system 302, wherein the diagnostic sheet comprises a top surface comprising a layer of material that is color responsive to a precoat solution, depositing a quantity of precoat solution on a top surface of the diagnostic sheet 304, allowing a colorimetric change between the precoat solution and the color responsive layer of material 306, analyzing the colorimetric change 308, and identifying a presence of precoat solution corresponding to one or more locations where the quantity of precoat solution was deposited 310. The method for diagnosing inkjet printing system performance 300 can include where the layer of material of the diagnostic sheet comprises a moisture sensitive composition, such as for example, cobalt chloride. Additionally, any of the materials mentioned herein could also be incorporated into the surface or material layer of the diagnostic sheet, such as 1-(1-Hydroxy-2-naphthylazo)-6-nitro-2-naphthol-4-sulfonicac-idsodium salt, pH indicators, or other materials, or combinations thereof. The method for diagnosing inkjet printing system performance 300 can also include analyzing the colorimetric change with the use of an image scanner to capture the diagnostic sheet, which further can include analyzing the colorimetric change by comparing a pattern of deposited precoat solution with a colorimetric change in one or more locations of the pattern of deposited precoat solution to determine where jets may be missing or misfired. In these locations that are indicative of missing jets, there will be the absence of a color change in locations where no primer has been applied to a surface of the diagnostic sheet.

A typical inkjet printer uses one or more printheads. Each printhead typically contains an array of individual nozzles, or jets, for ejecting drops of ink across an open gap to an image receiving member to form an image. In examples of the present disclosure, an additional printhead can be added to the printing system to deposit a primer or precoat solution prior to or after the deposition of one or more colors of ink. The image receiving member may be a continuous web of recording media, a series of media sheets, or the image receiving member may be a rotating surface, such as a print drum or endless belt. Images printed on a rotating surface are later transferred to recording media by mechanical force in a transfix nip formed by the rotating surface and a transfix roller. In an inkjet printhead, individual piezoelectric, thermal, or acoustic actuators generate mechanical forces that expel ink through an orifice from an ink filled conduit in response to an electrical voltage signal, sometimes called a firing signal. The magnitude, or voltage level, of the signals affects the amount of ink ejected in each drop. The firing signal is generated by a printhead controller in accordance with image data. An inkjet printer forms a printed image in accordance with the image data by printing a pattern of individual ink drops at particular locations on the image receiving member. The locations where the ink drops landed are sometimes called "ink drop locations," "ink drop positions," or "pixels." Thus, a printing operation can be viewed as the placement of ink drops on an image receiving member in accordance with image data.

In order for the printed images to correspond closely to the image data, both in terms of fidelity to the image objects and the colors represented by the image data, the printheads must be registered with reference to the imaging surface and with the other printheads in the printer. Registration of printheads is a process in which the printheads are operated to eject ink in a known pattern and then the printed image of the ejected ink is analyzed to determine the orientation of the printhead with reference to the imaging surface and with reference to the other printheads in the printer. Operating the printheads in a printer to eject ink in correspondence with image data presumes that the printheads are level with a width across the image receiving member and that all of the inkjet ejectors in the printhead are operational. The presumptions regarding the orientations of the printheads, however, cannot be assumed, but must be verified. Additionally, if the conditions for proper operation of the printheads cannot be verified, the analysis of the printed image should generate data that can be used either to adjust the printheads so they better conform to the presumed conditions for printing or to compensate for the deviations of the printheads from the presumed conditions. It should be noted that when added to an inkjet printing system, a printhead used for the purpose of dispensing or ejecting primer follows these same principles of operation and maintains many of the same requirements, save for standard adjustments also applicable to the general printing of inks within such systems.

Analysis of printed images is performed with reference to two directions. "Process direction" refers to the direction in which the image receiving member is moving as the imaging surface passes the printhead to receive the ejected ink and "cross-process direction" refers to the direction across the width of the image receiving member. In order to analyze a printed image, a test pattern needs to be generated so determinations can be made as to whether the inkjets operated to eject ink did, in fact, eject ink and whether the ejected ink landed where the ink would have landed if the printhead was oriented correctly with reference to the image receiving member and the other printheads in the printer. In some printing systems, an image of a printed image is generated by printing the printed image onto media or by transferring the printed image onto media, ejecting the media from the system, and then scanning the image with a flatbed scanner or other known offline imaging device. This method of generating a picture of the printed image suffers from the inability to analysis the printed image in situ and from the inaccuracies imposed by the external scanner. In some printers, a scanner is integrated into the printer and positioned at a location in the printer that enables an image of an ink image to be generated while the image is on media within the printer or while the ink image is on the rotating image member. These integrated scanners typically include one or more illumination sources and a plurality of optical detectors that receive radiation from the illumination source that has been reflected from the image receiving surface. The radiation from the illumination source is usually visible light, but the radiation may be at or beyond either end of the visible light spectrum. If light is reflected by a white surface, the reflected light has the same spectrum as the illuminating light. In some systems, ink on the imaging surface may absorb a portion of the incident light, which causes the reflected light to have a different spectrum. In addition, some inks may emit radiation in a different wavelength than the illuminating radiation, such as when an ink fluoresces in response to a stimulating radiation. Each optical sensor generates an electrical signal that corresponds to the intensity of the reflected light received by the detector. The electrical signals from the optical detectors may be converted to digital signals by analog/digital converters and provided as digital image data to an image processor. While the test pattern shown and described as printed onto a diagnostic sheet in reference to FIG. 2, applies to the printing of a primer or precoat solution, the same principles relating to test patterns of ink having a visible color upon printing or ejecting apply to the present disclosure as well. It should be noted that while the primers or precoat solutions are colorless as stored and deposited, it is in combination with the surface layer of the one or more examples of diagnostic sheets as described herein that a visible or scannable or detectable colored pattern can be discerned.

The ability to differentiate dashes or other features of different ink colors, or precoat solution, provided an appropriate surface layer on a diagnostic sheet, is subject to the phenomenon of missing or weak inkjet ejectors. Weak inkjet ejectors are ejectors that do not respond to a firing signal by ejecting an amount of ink that corresponds to the amplitude or frequency of the firing signal delivered to the inkjet ejector. A weak inkjet ejector, instead, delivers a lesser amount of ink. Consequently, the lesser amount of ink or primer ejected by a weak jet covers less of the image receiving member so the contrast of the signal generated by the optical detector with reference to an uncovered portion of the image receiving member is lower. Therefore, ink drops or primer drops in a dash ejected by a weak inkjet ejector may result in an electrical signal having a magnitude that is different than that expected. Missing inkjet ejectors are inkjet ejectors that eject little or no ink in response to the delivery of a firing signal. A process for identifying the inkjet ejectors that fail to eject ink drops or primer for such test patterns is discussed in more detail below can be found in U.S. Pat. No. 8,721,033, which is incorporated by reference herein. These concepts and methods can be applied to detecting and diagnosing issues in primer or precoat solution ejection when paired with an appropriate diagnostic sheet as described herein.

The printheads may be adjusted in the cross-process direction using actuators, such as electrical motors, that are operatively connected to a printhead or to a mounting member to which a printhead is mounted. These actuators are typically electro-mechanical devices that respond to control signals that may be generated by an appropriately configured controller. In one example, each printhead may be operatively connected to an independent actuator. In alternative examples, a group of two or more printheads, typically mounted to a single printhead bar, may be operatively connected to a single actuator to enable movement of the printhead group with the single actuator. All but one of the printheads are further mechanically coupled to independent secondary actuators, with the printhead not having an independent actuator being adjusted solely by the first actuator. This arrangement allows the first actuator to adjust all of the coupled printheads simultaneously, with the secondary independent actuators providing further adjustments to their respective printheads.

Another form of printhead alignment in the cross-process direction is known as stitch alignment. Stitch alignment occurs at the interface boundaries between adjacent printheads in a print array. Many printhead configurations arrange multiple printheads on different rows in a single array to span the entire cross-process width of an image receiving member that passes through the print zone. The multiple printheads are "stitched" together to form a seamless line in the cross process direction. Stitch error arises when a gap or overlap exists between edge nozzles of neighboring heads of the same color.

The diagnostic sheets and methods of use thereof in the present disclosure use colorimetric indicators that change color when exposed to Ca/Mg metal ions, including examples such as Eriochrome black T, Patton and Reeder's indicator (PR), and Calmagite. These indicators are routinely used in Biochemistry and Analytical chemistry to quantify calcium, magnesium, and other ions. The concentration and amount of the indicator used in the diagnostic sheets can potentially affect the detectable color change. Optimizing these parameters can be useful in eliciting a detectable color change that can be easily identified by an inline scanner, or even visual identification. In examples, the primer solution may not affect the colorimetric indicators on the diagnostic sheet. The color change observed on the diagnostic sheet is due to the interaction between the indicator and the precoat solution. This can be confirmed and tested by coating a substrate with an indicator solution and exposing it to the primer solution, observing the color change, and comparing it to a control sample without the primer solution. The method of detecting missing jets in a digital press with the use of a printhead jetting clear primer solution of the present disclosure can be adapted for other types of primers or pre-treatment options. However, the specific colorimetric indicators used may need to be adjusted depending on the composition of the primer solution. This diagnostic system and method can be adapted for use with different types of printheads by selecting appropriate colorimetric indicators that are compatible with the specific type of printhead being used. No major modifications to the system would be needed, as the existing inline scanner can be used to detect and correct missing jets.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A diagnostic system for measuring inkjet printing system performance, comprising:

a printhead, configured to deposit a colorless precoat solution from one or more of a plurality of ejector jets;

a diagnostic sheet, comprising:

a substrate having a first surface and a second surface; and a layer of material disposed on the first surface of the substrate, wherein the layer of material comprises 1-(1-Hydroxy-2-naphthylazo)-6-nitro-2-naphthol-4-sulfonicacidsodium salt, 3-hydroxy-4-[(2-hydroxy-4-sulfonaphthalen-1-yl)diazenyl]naphthalene-2-carboxylic acid, 1-(1-hydroxy-4-methyl-2-phenylazo)-2-naphthol-4-sulfonic acid, or a combination thereof and the layer of material changes color after contacting the precoat solution; and an image scanner configured to capture a color pattern on a surface of the diagnostic sheet after the precoat solution is deposited on the layer of material disposed on the first surface of the substrate.

2. The diagnostic system of claim 1, wherein the precoat solution comprises 5% wt to 40% wt of a salt in an aqueous solution.

3. The diagnostic system of claim 1, wherein the image scanner is inline with respect to the system.

4. The diagnostic system of claim 1, wherein the layer of material of the diagnostic sheet comprises a moisture sensitive composition.

5. The diagnostic system of claim 4, wherein the moisture sensitive composition comprises cobalt chloride.

6. The diagnostic system of claim 1, wherein the layer of material of the diagnostic sheet comprises a pH indicator.

7. The diagnostic system of claim 1, wherein the substrate comprises paper.

8. The diagnostic system of claim 1, wherein the precoat solution comprises magnesium chloride, calcium nitrate, barium, or a combination thereof.

9. A method for diagnosing inkjet printing system performance, comprising:

providing a diagnostic sheet to an inkjet printing system, wherein the diagnostic sheet comprises a top surface comprising a layer of material that changes color after contacting a precoat solution;

depositing a quantity of a colorless precoat solution on a top surface of the diagnostic sheet, resulting in a colorimetric change of the layer of material by jetting a plurality of drops of precoat solution using a printhead comprising a plurality of individual jets;

analyzing the colorimetric change to identify a presence or location of precoat solution corresponding to one or more locations where the quantity of colorless precoat solution was deposited; and disabling one or more jets if the presence or location of precoat solution identified on the diagnostic sheet is different than an expected presence or location.

10. The method for diagnosing inkjet printing system performance of claim 9, wherein the layer of material of the diagnostic sheet comprises a moisture sensitive composition.

11. The method for diagnosing inkjet printing system performance of claim 10, wherein the moisture sensitive composition comprises cobalt chloride.

12. The method for diagnosing inkjet printing system performance of claim 9, wherein layer of material of the diagnostic sheet comprises 1-(1-Hydroxy-2-naphthylazo)-6-nitro-2-naphthol-4-sulfonicacidsodium salt.

13. The method for diagnosing inkjet printing system performance of claim 9, wherein layer of material of the diagnostic sheet comprises a pH indicator.

14. The method for diagnosing inkjet printing system performance of claim 9, wherein:

analyzing the colorimetric change comprises scanning the diagnostic sheet with an image scanner; and analyzing the colorimetric change comprises comparing a pattern of deposited precoat solution with a colorimetric change in one or more locations of the pattern of deposited precoat solution.

15. The method for diagnosing inkjet printing system performance of claim 10, further comprising correcting a jetting operation of one or more of the individual jets if the presence or location of precoat solution identified on the diagnostic sheet is different than an expected presence or location; and wherein correcting a jetting operation comprises supplementing jetting using one or more additional jets, adjusting a timing of one or more individual jets, or a combination thereof.

16. A diagnostic sheet, comprising:

a substrate having a first surface and a second surface; and a layer of material disposed on the first surface of the substrate; and wherein the layer of material comprises 1-(1-Hydroxy-2-naphthylazo)-6-nitro-2-naphthol-4-sulfonicacidsodium salt, 3-hydroxy-4-[(2-hydroxy-4-sulfonaphthalen-1-yl)diazenyl]naphthalene-2-carboxylic acid, 1-(1-hydroxy-4-methyl-2-phenylazo)-2-naphthol-4-sulfonic acid, or a combination thereof, and the layer of material changes color when in contact with a precoat solution.

17. The diagnostic sheet of claim 16, wherein the layer of material of the diagnostic sheet comprises a moisture sensitive composition or a pH indicator.

* * * * *